(12) United States Patent
Bosselmann

(10) Patent No.: US 8,381,599 B2
(45) Date of Patent: Feb. 26, 2013

(54) WIND ENERGY INSTALLATION COMPRISING A WIND SPEED MEASURING SYSTEM

(75) Inventor: Thomas Bosselmann, Marloffstein (DE)

(73) Assignee: Siemens Aktiengesellschaft, Munich (DE)

( * ) Notice: Subject to any disclaimer, the term of this patent is extended or adjusted under 35 U.S.C. 154(b) by 121 days.

(21) Appl. No.: 12/999,758

(22) PCT Filed: Jun. 30, 2009

(86) PCT No.: PCT/EP2009/058156
§ 371 (c)(1),
(2), (4) Date: Dec. 17, 2010

(87) PCT Pub. No.: WO2010/000722
PCT Pub. Date: Jan. 7, 2010

(65) Prior Publication Data
US 2011/0107846 A1  May 12, 2011

(30) Foreign Application Priority Data
Jul. 3, 2008  (EP) .................................... 08012067

(51) Int. Cl.
*G01F 1/20* (2006.01)
(52) U.S. Cl. ................................... 73/861.18
(58) Field of Classification Search ............. 73/861.18, 73/170, 15; 356/28
See application file for complete search history.

(56) References Cited

U.S. PATENT DOCUMENTS 7,086,834 B2* 8/2006 LeMieux ............... 416/1
8,139,206 B2* 3/2012 Antoniou et al. ............ 356/28

FOREIGN PATENT DOCUMENTS

| DE | 10 2006 041 461 A1 | 3/2008 |
| EP | 0970308 A1 | 1/2000 |
| EP | 1936332 A1 | 6/2008 |
| GB | 2111680 A | 7/1983 |
| GB | 2238380 A | 5/1991 |

OTHER PUBLICATIONS

Jin W. et al, "A fibre-optic grating sensor for the study of flow-induced vibrations", Sensors and Actuators A, Elsevier Sequoia S.A., Lausanne, CH, vol. 79, No. 1, Jan. 1, 2000, pp. 36-45; Magazine; 2000.

* cited by examiner

*Primary Examiner* — Jewel V Thompson

(57) ABSTRACT

A wind energy installation is disclosed. The wind energy installation includes a rotor with at least one rotor blade. The wind energy installation includes at least one wind speed measuring system. The at least one wind speed measuring system optically measures the vibrations of an optical fiber due to vortex shedding.

10 Claims, 2 Drawing Sheets

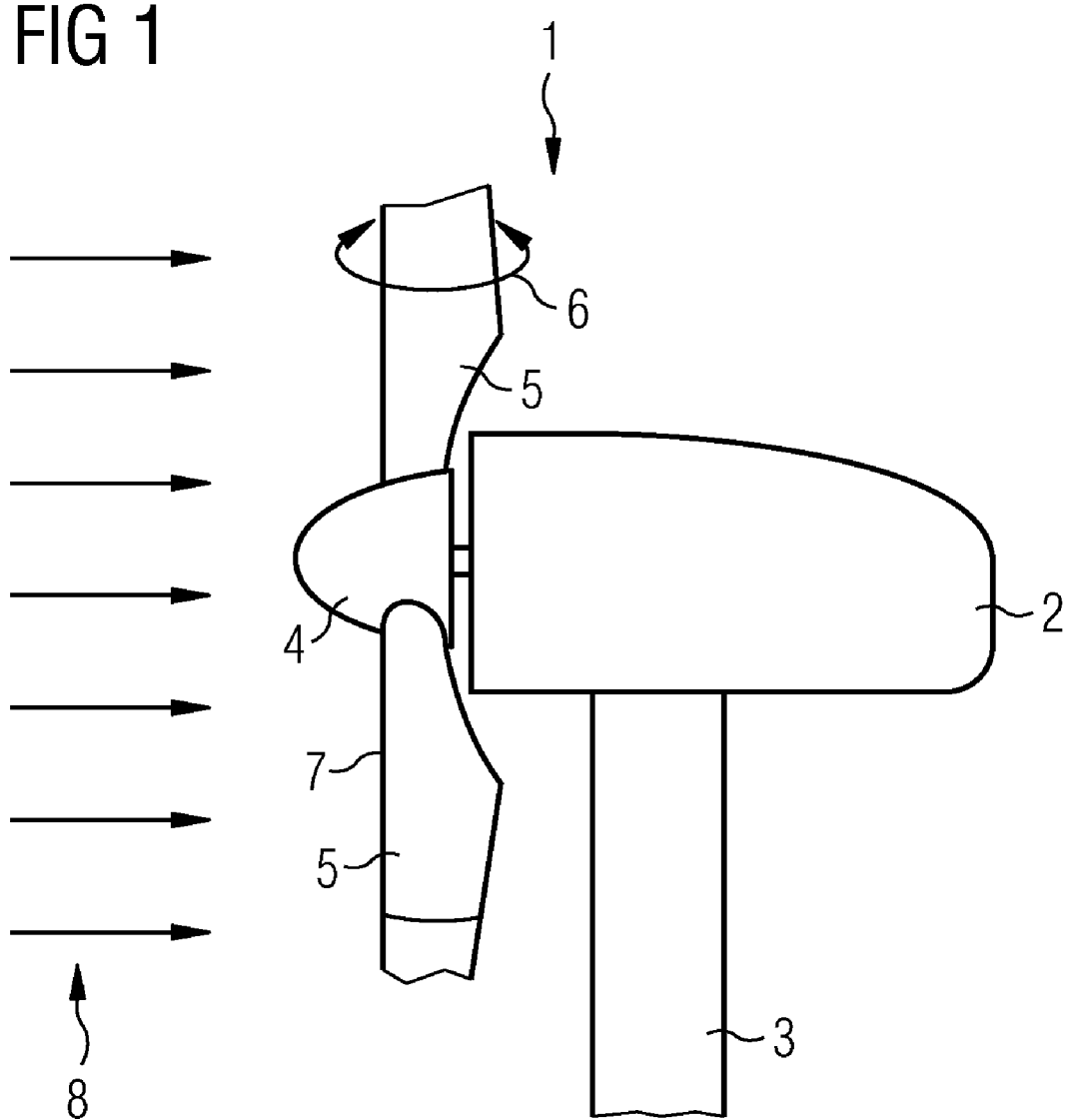

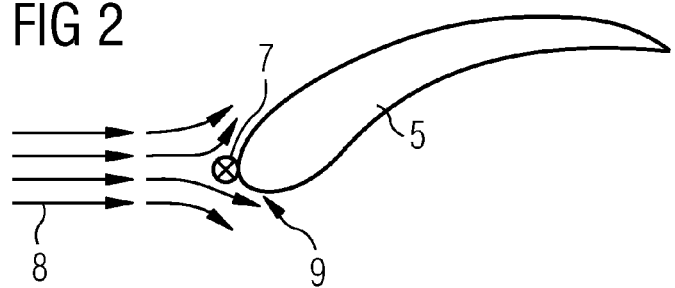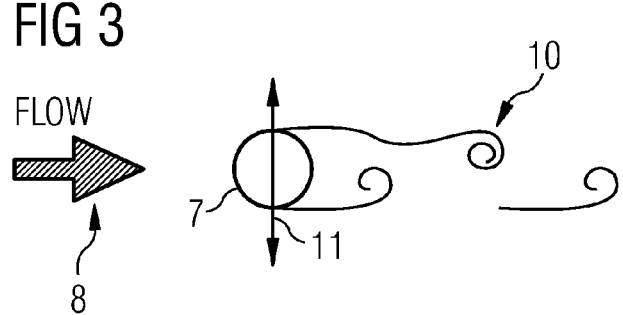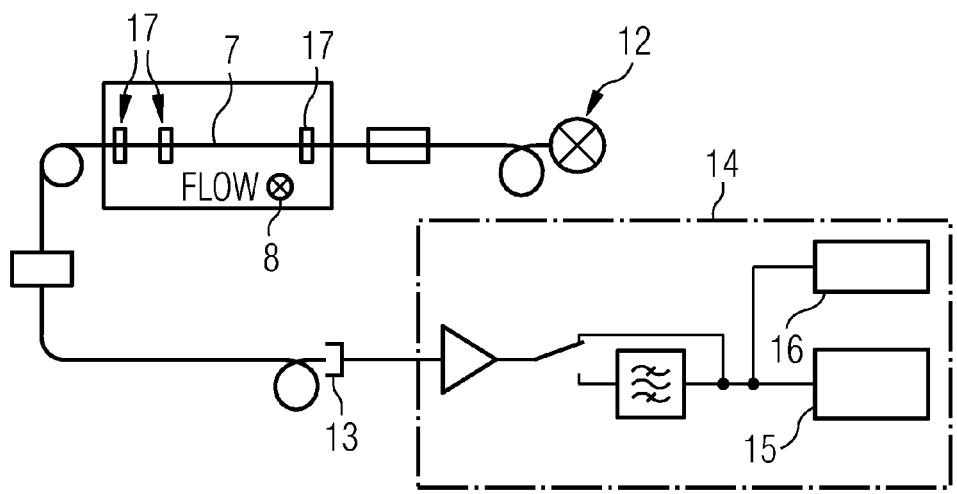

WIND ENERGY INSTALLATION COMPRISING A WIND SPEED MEASURING SYSTEM

CROSS REFERENCE TO RELATED APPLICATIONS

This application is the US National Stage of International Application No. PCT/EP2009/058156, filed Jun. 30, 2009 and claims the benefit thereof. The International Application claims the benefits of European application No. 08012067.8 filed Jul. 3, 2008. All of the applications are incorporated by reference herein in their entirety.

FIELD OF THE INVENTION

The invention relates to a wind energy installation comprising a wind speed measuring system.

BACKGROUND OF THE INVENTION

The invention relates to a wind energy installation or windmill comprising a wind turbine comprising a rotor and at least one or a plurality of rotor blades. Such wind energy installations are typically installed in regions with high potential of wind energy to increase the amount of electrical energy generated using such wind energy installation. Usually the at least one rotor blade or the plurality of rotor blades are very large and might be tuned e.g. in angle with respect to the direction of the wind and speed of the wind. Therefore the angle of the rotor blades is adjustable with respect to a predetermined direction. In case of very high wind speed the rotor blades are adjustable to reduce the energy produced by the installation or that almost no electrical energy is generated at all. Therefore the risk of damages due to high wind speed might be strongly reduced by the setting of the rotor blades.

Therefore a wind speed measuring system is needed to measure the wind speed and to control the wind energy installation and the pitch of the rotor blades respectively.

EP 0 970 308 B1 discloses a wind speed measuring system which uses a laser anemometry system which uses a laser beam which is directed to particles in the air which itself reflect part of the light of the laser beam and a sensor device is used to measure the light reflected by the laser beam. Since the speed of the particles is almost equal to the speed of the air it is possible to analyse the speed of the particles in order to measure the speed of the air or of the wind. The technique of the system uses an integral measuring method measuring the light reflected from a large amount of particles and therefore the data of the light analysed by the system is an average of the data of the plurality of particles. Accordingly it is not easily achievable to measure the speed of a single particle to determine the speed of the air at a predetermined location or spot at the wind energy installation or in the vicinity of the rotor blades.

Furthermore the measurement equipment and the method are both rather complicated and not adapted to measure the wind speed during the whole operation time of the system.

Furthermore DE 10 2006 041 461 A1 discloses a wind speed measuring system which uses an optical fiber to measure the wind speed. The optical fiber will be heated and due to the wind speed a cooling of the fiber will happen. Therefore the temperature of the fiber is a direct measure of the wind speed at the optical fiber. For detecting the temperature of the optical fiber a fiber Bragg grid (FBG) is used. The fiber Bragg grid technology uses the light reflected within the fiber which is reflected at the Bragg grid itself and the effect that the wave length of the reflected light depends upon the temperature of the spot of the fiber where the fiber Bragg grid is located. The dependency from the temperature stems from the dependency of the optical properties from temperature. Therefore the fiber Bragg grid (FBG) allows indirectly the measurement of the wind speed at a predetermined spot of the fiber due to the indirect measurement of the temperature of the fiber.

The above mentioned technology has the striking drawback that the optical fiber has to be heated all the time at a very constant temperature in order to measure the wind speed with an expected degree of accuracy. The heating of the fiber consumes electrical energy and is this energy consumption is therefore strongly inefficient and not acceptable for a standard use during extended time periods. In case of a use only from time to time including periods of time without wind speed measurement the wind energy installation reveals a great disadvantage with regard to safety of the installation itself.

OBJECT AND SUMMARY OF THE INVENTION

It is an object of the invention to create a wind energy installation with a wind speed measurement system which does not show the disadvantages of the known techniques and which might be used on a regular basis without excessive energy consumption.

The object of the invention will be solved by a wind energy installation including a rotor comprising at least one rotor blade wherein the wind energy installation comprises at least one wind speed measuring system which optically measures the vibrations of an optical fiber due to vortex shedding according to the features of the independent claims.

Vortex shedding is an unsteady air flow that takes place behind a cylindrical body, when a minimum flow speed is reached. When the air flows past the cylindircal body it creates alternating low-pressure vortices on the downwind side of the cylindircal body which will then tend to move toward the low-pressure zone. The minimum flow speed which leads to vortex shedding depends on to the size and shape of the optical fiber cylindrical body. Hence, shape and size of the optical fiber in the wind speed measuring system are chosen such that vortex shedding occurs behind the fibre at the wind conditions in a wind turbine.

According to the invention it is of advantage that the wind energy installation further comprises at least one optical fiber which is arranged at the rotor and/or at at least one of the rotor blades and/or at the pylon and/or at the nacelle of the installation. Therefore the at least one optical fiber is arranged at locations of interest where the wind speed might be measured e.g. at the wind ward side of the rotor blade or at the leading edge of the rotor blade.

In order to measure the wind speed the wind energy installation comprises a light emitting source which emits light which is fed through the optical fiber. As an example of such a light source a light emitting diode (LED) might be used which is additionally small in size and preferably easy to be installed.

Additionally the wind energy installation further comprises a light receiving sensor which detects light reflected from a sensor of the optical fiber. Such a light receiving sensor might be e.g. a photodetector.

Furthermore it might be of advantage that the installation further comprises a control and analysing unit, which analyses the reflected light from the at least one sensor and calculates a shift of the frequency as a difference of the frequency of the emitted light and the frequency of the reflected light as result of vibrations of the optical fiber and therefore calculates the wind speed of the wind passing the optical fiber. Furthermore the control and analysing unit may control the pitch of the blades.

Additionally it is of advantage that the sensor comprises at least one Bragg grid grating sensor which might be realised as fiber Bragg grid (FBG). This at least one Bragg grid grating sensor is preferably located within the optical fiber.

Furthermore it is of advantage that a plurality of Bragg grid grating sensors are located at different positions within the optical fiber. Therefore the distance between the different Bragg grid grating sensors allows a local resolution of the wind speed measurement to measure the wind speed at different spots of the installation at almost the same time or in a serial measuring application.

In order to allow multiplexing of the frequency measurement of the different Bragg grid grating sensors the sensors are build such that they have different mean reflection frequencies.

Furthermore it is of advantage that the control and analysing unit calculates the wind speed the light reflected from the different Bragg grid grating sensors and accordingly it calculates the variation of wind speed along the optical fiber.

BRIEF DESCRIPTION OF THE DRAWINGS

The above and other features and advantages of the invention will be apparent from the following description of an exemplary embodiment of the invention with reference to the accompanying drawings, in which:

FIG. 1 shows a schematic view of a wind energy installation comprising a rotor and rotor blades;

FIG. 2 shows a cross-section of a rotor blade comprising an optical fiber;

FIG. 3 shows a cross-section of a fiber; and

FIG. 4 shows a measuring system.

DESCRIPTION OF EMBODIMENTS

FIG. 1 shows schematically a wind energy installation 1 comprising a nacelle 2 which is mounted on top of a pylon 3 and which comprises a rotor 4 comprising at least one rotor blade 5. The embodiment of FIG. 1 shows two rotor blades 5. In order to tune the rotor blades 5 e.g. due to wind speed and wind direction the blades 5 are pivot-mounted within the rotor 4 as indicated by arrow 6.

In order to measure the wind speed of the wind 8 blowing at the vicinity of the installation 1 the installation 1 comprises at least one optical fiber 7 which allows to measure the wind speed by way of measurement of vibrations of the optical fiber 7 originated by vortex shedding.

FIG. 2 shows an example of a cross-section of a rotor blade 5 which contains an optical fiber 7 at the leading edge 9 of the blade 5. The fiber 7 is located at the leading edge and is fixed at a certain distance from the leading edge such that the fiber 7 is able to vibrate due to vortex shedding.

FIG. 3 schematically shows the effect of vortex shedding due to the wind 8 blowing in the direction almost rectangular to the fiber 7. If the wind speed is large enough the effect of vortex 10 shedding occurs and a force 11 is generated acting on the fiber 7 in a direction perpendicular to the direction of the wind speed, see e.g. arrows of the wind 8.

FIG. 4 shows schematically a diagram of a measuring system comprising the fiber 7 and additional equipment. The wind 8 is blowing almost rectangular to the fiber 7 and creates vibrational forces acting on the fiber 7 leading to vibrations of the fiber itself. The vibrations lead to local changes of the optical properties of fiber 7 which itself changes the frequency or wave length of light reflected by the Bragg grid grating sensor 17 which is located at the fiber 7. Note, that according to the invention the at least one Bragg grid grating sensor 17 is located within the optical fiber 7. However, it is advantageous if a plurality of Bragg grid grating sensors 17 are located at different positions within the optical fiber 7. The use of different Brag grid grating sensors 17 allows the calculation of the wind speeds at different locations or spots of the fiber which allows to measure the wind speed deviations in the vicinity of the wind energy installation. In addition, it allows to determine wind speed profiles along the blade's edge. To allow wavelenth multiplexing, it is advantageous if the Bragg grid grating sensors 17 are such that they comprise different mean reflection frequencies.

A light source 12 is emitting light which passes through the fiber. Such light emitting source 12 is e.g. a light emitting diode (LED). Furthermore a light receiving sensor or detector 13 is installed to measure the light reflected by the Bragg grid grating sensor 17 and a control and analysing unit 14 is provided to analyse the light reflected to receive a measure of the wind speed as the source of the vibrations of the fiber 7. Therefore the unit 14 comprises a data capture and storing unit 15 and a frequency analysing unit 16. The control and analysing unit 14 analyses the light reflected by the grid and calculates a shift of the frequency as a difference of the frequency of the emitted light and the frequency of the reflected light as result of vibrations of the optical fiber and therefore calculates the wind speed of the wind passing the optical fiber 7.

According to the invention the wind energy installation 1 comprises a rotor 4 comprising at least one rotor blade 5 or preferably a plurality of rotor blades. Additionally the installation 1 comprises furthermore at least one wind speed measuring system which optically measures the vibrations of an optical fiber 7 due to vortex shedding.

According to the embodiment, the at least one optical fiber 7 has been described to be arranged at the leading edge 9 of a rotor blade 5. However, additionaly or alternatively, one or more optical fibers 7 can be arranged at other locations of the wind turbine, like, e.g. at the rotor hub and/or at the nacelle 2 of the installation 1 and/or at the pylon 3 of the installation 1.

The invention claimed is:

1. A wind energy installation including a rotor comprising at least one rotor blade, comprising:
    a light emitting source which emits light which is fed through an optical fiber,
    a light receiving sensor which detects light reflected from a sensor of the optical fiber;
    at least one wind speed measuring system which optically measures the vibrations of the optical fiber due to vortex shedding, the vortex shedding occurring behind the fibre; and
    a control and analyzing unit which analyzes the reflected light and calculates a shift of the frequency as a difference of the frequency of the emitted light and the frequency of the reflected light as a result of vibrations of the optical fiber in order to calculate the wind speed of the wind passing the optical fiber.

2. The wind energy installation according to claim 1, wherein the optical fiber is arranged at the rotor.

3. The wind energy installation according to claim 1, wherein the optical fiber is arranged at the least one of the rotor blades.

4. The wind energy installation according to claim 1, wherein the optical fiber is arranged at a nacelle.

5. A wind energy installation including a rotor with at least one rotor blade comprising:

a rotor comprising at least one rotor blade; and at least one wind speed measuring system which optically measures the vibrations of an optical fiber due to vortex shedding, wherein the optical fiber is arranged at a pylon.

6. The wind energy installation according to claim 1, wherein the light receiving sensor comprises at least one Bragg grid grating sensor.

7. The wind energy installation according to claim 6, wherein the at least one Bragg grid grating sensor is located within the optical fiber.

8. The wind energy installation according to claim 1, wherein the light receiving sensor comprises a plurality of Bragg grid grating sensors located at different positions within the optical fiber.

9. The wind energy installation according to claim 8, wherein each of the plurality of Bragg grid grating sensors have different mean reflection frequencies.

10. The wind energy installation according to claim 1, wherein the light receiving sensor comprises a plurality of Bragg grid grating sensors located at different positions within the optical fiber, and wherein the control and analysing unit calculates the wind speed the light reflected from the plurality of Bragg grid grating sensors and calculates the variation of wind speed along the optical fiber.

* * * * *